(12) United States Patent
Tremblay

(10) Patent No.: US 8,564,608 B2
(45) Date of Patent: Oct. 22, 2013

(54) DISPLAY OF VISUAL IMAGES BY FRACTIONAL COLOR GRADIENT INCREMENTS

(75) Inventor: Christopher Tremblay, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 257 days.

(21) Appl. No.: 13/283,918

(22) Filed: Oct. 28, 2011

(65) Prior Publication Data

US 2013/0106886 A1    May 2, 2013

(51) Int. Cl.
*G09G 5/00* (2006.01)
*G09G 5/02* (2006.01)

(52) U.S. Cl.
USPC .......................................... 345/582; 345/589

(58) Field of Classification Search
None
See application file for complete search history.

(56) References Cited

U.S. PATENT DOCUMENTS

| | | | |
|---|---|---|---|
| 6,879,327 B1 * | 4/2005 | Mathur et al. | 345/589 |
| 7,466,319 B1 * | 12/2008 | Kirkland et al. | 345/589 |
| 7,706,633 B2 | 4/2010 | Chefd'hotel et al. | |
| 7,965,289 B1 | 6/2011 | Green et al. | |
| 8,044,956 B1 * | 10/2011 | Kilgard | 345/426 |
| 2004/0164992 A1 * | 8/2004 | Gangnet et al. | 345/591 |
| 2006/0119599 A1 * | 6/2006 | Woodbury, Jr. | 345/420 |
| 2008/0055331 A1 | 3/2008 | Iourcha et al. | |
| 2008/0198168 A1 | 8/2008 | Jiao et al. | |

FOREIGN PATENT DOCUMENTS

WO    WO-2010133007    11/2010

OTHER PUBLICATIONS

Lahabar,S. "Exploiting the Graphics Hardware to Solve Two Compute Intensive Problems . . . ", Aug. 2010.

* cited by examiner

*Primary Examiner* — Kee M Tung
*Assistant Examiner* — Nurun N Flora

(57) ABSTRACT

Displaying visual images by fractional color gradient increments. Distances between adjacent pairs of color shades in a color gradient are scaled down to distances of which the largest is one. The scaled distances are converted into fractions. A largest common denominator of the fractions is determined. The fractions are converted into fractions having the largest common denominator. Numerators of the converted fractions are used to provide samples of the color gradient at intervals of the largest common denominator. A texture is created from the samples. A visual image is displayed on a visual display according to the texture.

15 Claims, 3 Drawing Sheets

DISPLAY OF VISUAL IMAGES BY FRACTIONAL COLOR GRADIENT INCREMENTS

BACKGROUND

A graphics processing unit (GPU) may be described as a microprocessor designed to render graphical images efficiently for display, speeding up the rendering process and relieving the central processing unit (CPU) of this task. A computer system having a GPU as well as a CPU can be expected to render graphical images faster than a computer system without a GPU and to be more efficient in performing other computational tasks because the CPU is not being burdened with rendering graphical images. In a multi-color image handed to a GPU for rendering, color shading is described by a color gradient which includes two parameters: a color shade, and a distance in number of pixels for which that shade is to be displayed.

BRIEF DESCRIPTION OF THE DRAWINGS

The drawings illustrate by example implementations of the invention.

DETAILED DESCRIPTION

Figure 1:
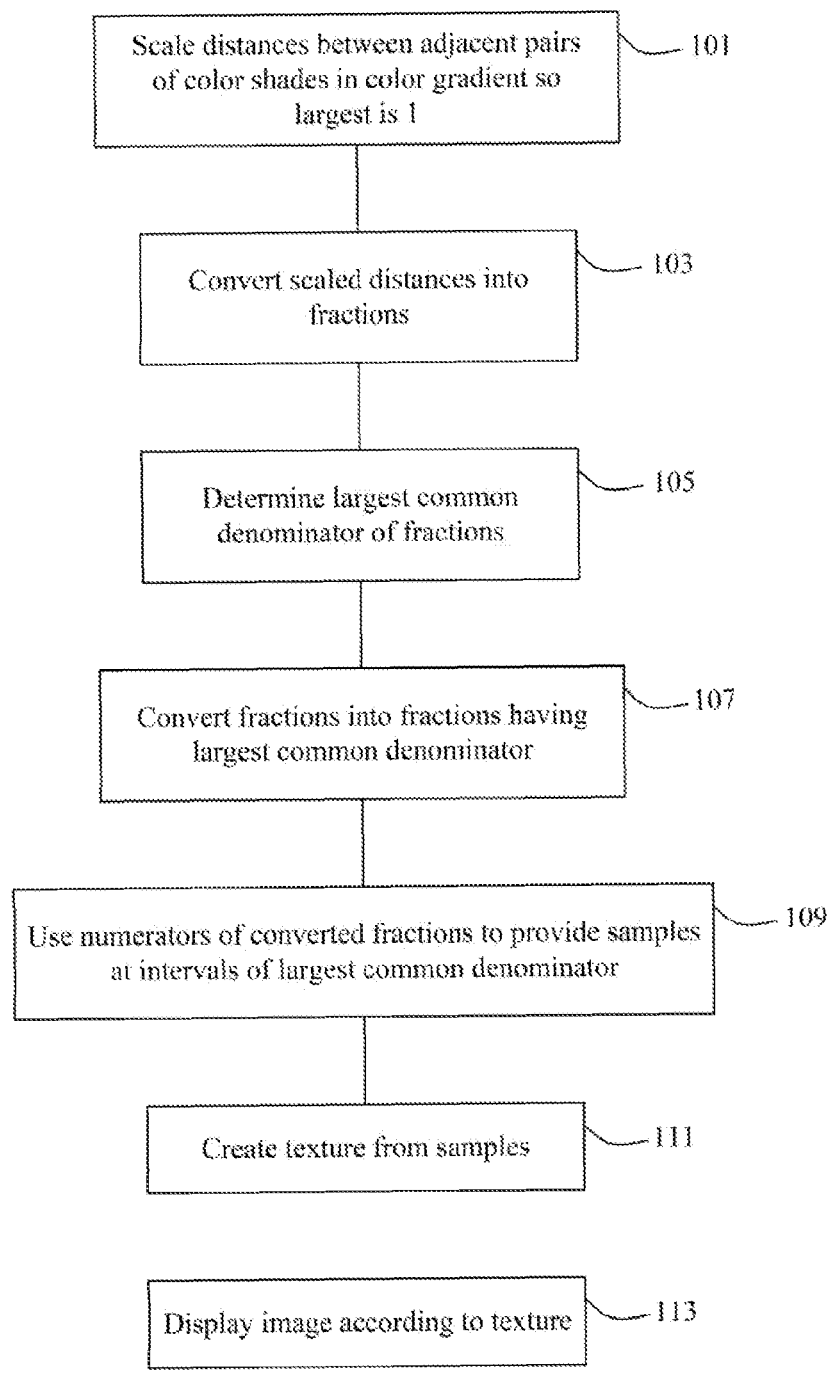
FIG. 1 is a flowchart illustrating a method of displaying visual images by fractional color gradient increments.

In the drawings and in this description, examples and details are used to illustrate principles of the invention. Other configurations may suggest themselves. Parameters are approximate. Terms of orientation such as up, down, top, and bottom are used only for convenience to indicate spatial relationships of components with respect to each other, and except as otherwise indicated, orientation with respect to external axes is not critical. Some known methods and structures have not been described in detail in order to avoid obscuring the invention.

Methods defined by the claims may comprise steps in addition to those listed, and except as indicated in the claims themselves the steps may be performed in another order than that given. The systems and methods described herein may be implemented in various forms of hardware, software, firmware, special purpose processors, or a combination thereof. At least a portion of the invention may be implemented as an application comprising program instructions that are tangibly embodied on one or more program storage devices, for example hard disks, floppy disks, CDROMs, RAM, and ROM, or that may be executed remotely over a network. Connections between system modules or the logic flow of method steps may differ depending on the manner in which the invention is programmed.

In light of the foregoing, the invention may be practiced without limitation to the details and arrangements as described. The invention is to be limited only by the claims, not by the drawings or this description.

Rendering images in a GPU typically requires creating a flattened linearly-sampled pixel map. Such a map may range from a one-dimensional list of 1,024 pixels or more to a full two-dimensional color gradient of thousands of pixels in each dimension. The map gives various color shades and, for each color shade, a distance in number of pixels. To render such a gradient for display, the GPU samples the gradient in increments of fixed size. This sampling can be inefficient because using a fixed sample size may result in taking more samples than are actually needed. Or, if the sample size is larger than some of the actual distances, the sampling can introduce artifacts and may even result in missing colors. Accordingly there is a need for a way to have a GPU render color gradients in a pixel map efficiently and without altering the image.

FIG. 1 illustrates a method of displaying visual images by fractional color gradient increments. Distances between adjacent pairs of color shades in a color gradient are scaled down to scaled distances of which the largest is one (101). The scaled distances are converted into fractions (103). A largest common denominator of the fractions is determined (105) and the fractions are converted into fractions having the largest common denominator (107). Numerators of the converted fractions are used to provide samples of the color gradient at intervals of the largest common denominator (109). A texture is created from the samples (111). A visual image is displayed on a visual display according to the texture (113).

In some embodiments scaling the distances comprises dividing the value of each distance by the value of the largest distance.

In some embodiments the scaled distances are converted into fractions by using a Greatest Common Divisor (GCD) technique such as prime factorization and the Euclidean algorithm. The GCD of two numbers is the largest number that divides both of them without leaving a remainder.

Finding the GCD of numbers of the relatively manageable sizes that may be encountered as distances between color shades by prime factorization is relatively straightforward. One technique is simply to divide the distance repeatedly by prime integers, each no larger than the square root of the number into which it is being divided, until what is left is a set of prime integers.

Using the Euclidean algorithm to find the GCD is based on the principle that the greatest common divisor of two numbers does not change if the smaller number is subtracted from the larger number. For example, 21 is the GCD of 252 and 105 (252=21×12; 105=21×5); since 252−105=147, the GCD of 147 and 105 is also 21. Since the larger of the two numbers is reduced, repeating this process gives successively smaller numbers until one of them is zero. When that occurs, the GCD is the remaining nonzero number. This algorithm may be computationally more efficient that prime factorization.

Determining the largest common denominator may be accomplished by determining a Least Common Multiple (LCM), that is, the smallest integer that is a multiple of each of the denominators. The texture may be provided by linear interpolation between the samples.

For example, assume a color gradient in which a color of Shade A is between positions 0 and 1 and a color of Shade B is between positions 1 and 5. The distances between shades are $\{0, 1, 4\}$. Scaling these distances so the largest is one results in $\{0, 0.25, 1\}$. Converting these scaled distances into fractions results in $\{0, 1/4, 1/1\}$. The largest common denominator of these fractions is 4. Converting the fractions into fractions having this largest common denominator of 4 results in $\{0/4, 1/4, 4/4\}$. The numerators of these fractions are used to provide samples indicating color shades at intervals of the largest common denominator which is $1/4$. These samples include Shade A at position 0 and Shade B at positions 1, 2, 3, and 4. In this way, only five samples have been taken and there has been no loss of precision when compared with any procedure involving more samples. Linear interpolation may be used between the samples to provide the texture having more than 5 samples were taken. The texture is used to display a visual image on a visual display.

As another example, assume a color gradient in which:
shade A is between positions 0 and 200,
shade B is between positions 200 and 250,
shade C is between 250 and 700, and
shade D is between 700 and 1000.

The distances between shades are {0, 200, 50, 450, and 300}. Scaling these distances results in {0, 4/9, 1/9, 1, 2/3}. Converting these scaled distances into fractions results in {0/9, 4/9, 1/9, 9/9, and 6/9}. The largest common denominator is 9. Using the numerators to provide samples results in a texture having Shade A at positions 0 and 111, Shade B at 222, Shade C at 333, 444, 555, and 666, and Shade D at 777, 888 and 999. Only 9 samples were needed even though there were 1000 possible positions.

Figure 2:
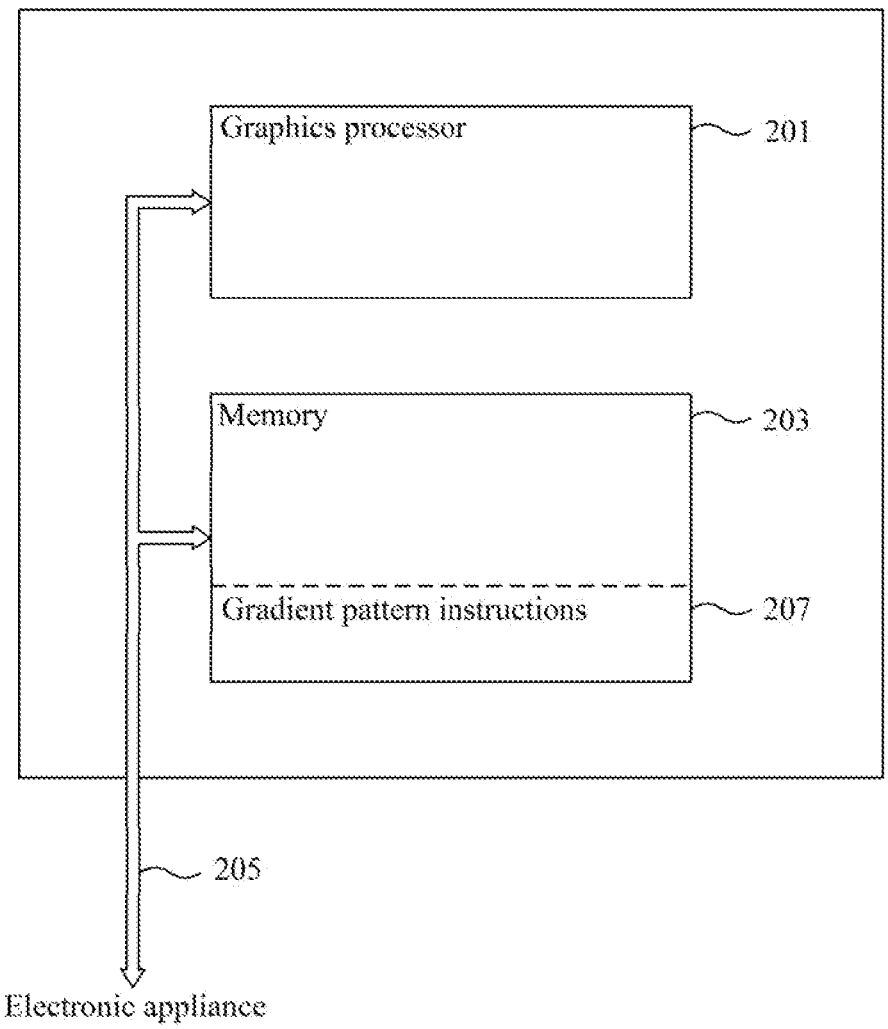
FIG. 2 is a block diagram of a graphics display system that displays visual images by fractional color gradient increments.

As shown in FIG. 2, a graphics display system that displays visual images by fractional color gradient increments includes a graphics processor 201, memory 203, a bus 205 connecting the graphics processor, the memory, and an electronic appliance, and gradient pattern machine instructions 207 in the memory. The graphics processor is responsive to the instructions to scale distances between adjacent pairs of color shades in a color gradient down to scaled distances of which the largest is one, convert the scaled distances into fractions, determine a largest common denominator of the fractions, convert the fractions into fractions having the largest common denominator, provide samples of the color gradient at intervals of the largest common denominator, create a texture from the samples, generate a visual image according to the texture, and transmit the visual image to the electronic appliance for display.

In some embodiments the memory may comprise a cache memory that may be integral with the graphics processor or included on a separate device.

Figure 3:
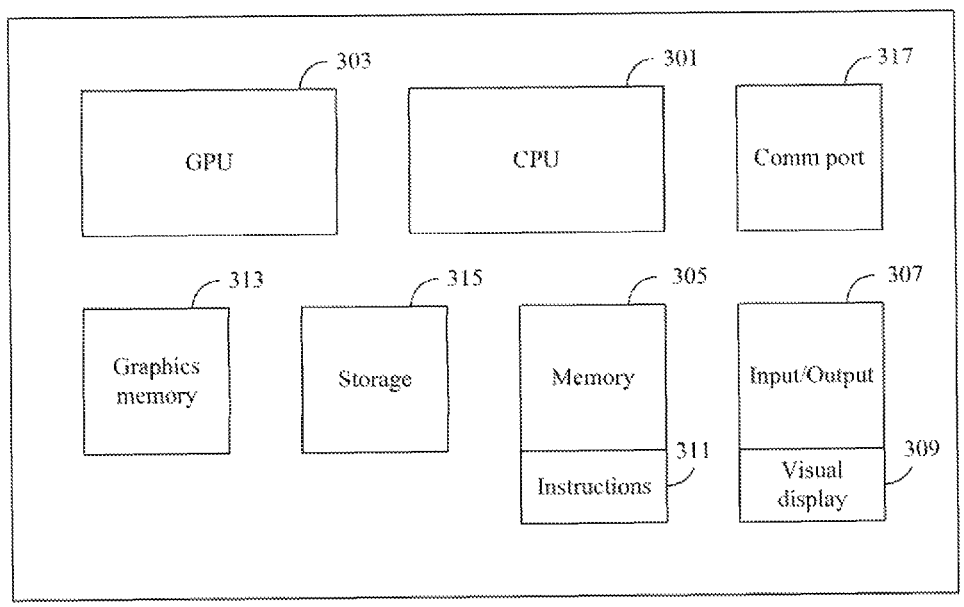
FIG. 3 is a block diagram of a computer system in which visual images are displayed by fractional color gradient increments.

A computer system in which visual images are displayed by fractional color gradient increments is shown in FIG. 3. The system includes a central processing unit 301, a graphics processing unit 303, memory 305, input/output facilities 307 including a visual display 309, and gradient pattern machine instructions 311 in the memory. The central processing unit and the graphics processing unit are responsive to the instructions to scale distances between adjacent pairs of color shades in a color gradient down to scaled distances of which the largest is one, convert the scaled distances into fractions, determine a largest common denominator of the fractions, convert the fractions into fractions having the largest common denominator, provide samples of the color gradient at intervals of the largest common denominator, create a texture from the samples, generate a visual image according to the texture, and cause the image to be displayed on the visual display.

The computer system may include any of a separate graphics memory 313, a storage unit 315 such as a hard disk, and a communication port 317. A bus (not shown) or other suitable arrangement interconnects the various components of the computer system. The instructions 311 are shown as residing in the memory 305, but in some embodiments the instructions may reside in one or more of the graphics memory 313, the storage unit 315, or a local or remote external location that the computer system communicates with through the communication port. Each of the memory 305 and the graphics memory 313 may be one or more of random access memory, read-only memory, or cache memory associated with one or both of the processing units.

Rendering gradients in a GPU according to the foregoing principles results in a compact rendition. This saves space and speeds up system performance. A smaller texture is more likely to remain in cache rather than in main memory or storage, further improving performance. Also, aliasing artifacts and missing colors are avoided.

I claim:

1. A method of displaying visual images by fractional color gradient increments, the method comprising:
    scaling distances between adjacent pairs of color shades in a color gradient down to scaled distances of which the largest is one;
    converting the scaled distances into fractions;
    determining a largest common denominator of the fractions;
    converting the fractions into fractions having the largest common denominator;
    using numerators of the converted fractions to provide samples of the color gradient at intervals of the largest common denominator;
    creating a texture from the samples; and
    displaying a visual image according to the texture on a visual display.

2. The method of claim 1 wherein scaling the distances comprises dividing the value of each distance by the value of the largest distance.

3. The method of claim 1 wherein converting the scaled distances into fractions comprises using at least one of prime factorization and Euclid's algorithm.

4. The method of claim 1 wherein determining the largest common denominator comprises determining a least common multiple.

5. The method of claim 1 wherein creating the texture comprises linear interpolation between the samples.

6. A graphics display system that displays visual images by fractional color gradient increments, the system comprising:
    a graphics processor;
    a memory;
    a bus connecting the graphics processor, the memory, and an electronic appliance; and
    gradient pattern machine instructions in the memory, the graphics processor responsive to the instructions to scale distances between adjacent pairs of color shades in a color gradient down to scaled distances of which the largest is one, convert the scaled distances into fractions, determine a largest common denominator of the fractions, convert the fractions into fractions having the largest common denominator, provide samples of the color gradient at intervals of the largest common denominator, create a texture from the samples, generate a visual image according to the texture, and transmit the visual image to the electronic appliance for display.

7. The system of claim 6 wherein the memory comprises a cache memory.

8. The system of claim 6 wherein the machine instructions cause the graphics processor to scale the set of distances by dividing the value of each distance by the value of the largest distance.

9. The system of claim 6 wherein the machine instructions cause the graphics processor to determine the largest common denominator by determining a least common multiple.

10. The system of claim 6 wherein the machine instructions cause the graphics processor to create the texture by linear interpolation between the samples.

11. A computer system in which visual images are displayed by fractional color gradient increments, the system comprising:
    a central processing unit;
    a graphics processing unit;

memory;

input/output facilities including a visual display; and gradient pattern machine instructions in the memory, the central processing unit and the graphics processing unit responsive to the instructions to scale distances between adjacent pairs of color shades in a color gradient down to scaled distances of which the largest is one, convert the scaled distances into fractions, determine a largest common denominator of the fractions, convert the fractions into fractions having the largest common denominator, provide samples of the color gradient at intervals of the largest common denominator, create a texture from the samples, generate a visual image according to the texture, and cause the image to be displayed on the visual display.

12. The computer system of claim 11 wherein the memory comprises at least one of a random-access memory, a read-only memory, a cache memory associated with the graphics processing unit, a cache memory associated with the central processing unit, and disk storage.

13. The computer system of claim 11 wherein the instructions cause the graphics processor to scale the set of distances by dividing the value of each distance by the value of the largest distance to obtain a set of fractions, and reducing the fractions.

14. The computer system of claim 11 wherein the instructions cause the graphics processor to scale the set of distances by scaling each distance to a decimal value of which the largest is one, and converting each decimal value into an integer fraction.

15. The computer system of claim 11 wherein the instructions cause the graphics processor to use a fraction of which the numerator is one and the denominator is the largest common denominator as the increment for interpolating.

* * * * *